United States Patent
Fu et al.

(10) Patent No.: US 6,292,171 B1
(45) Date of Patent: Sep. 18, 2001

(54) METHOD AND APPARATUS FOR CALIBRATING A COMPUTER-GENERATED PROJECTED IMAGE

(75) Inventors: Bin Fu, Mountain View; Shang-Hung Lin, San Jose, both of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/283,093

(22) Filed: Mar. 31, 1999

(51) Int. Cl.$^7$ .................................................. G09G 5/00
(52) U.S. Cl. ............................................. 345/156; 702/95
(58) Field of Search ..................................... 345/156, 158, 345/163, 145; 702/95; 348/141; 353/121, 122

(56) References Cited

U.S. PATENT DOCUMENTS

| | | | |
|---|---|---|---|
| 4,280,135 | 7/1981 | Schlossberg | 348/61 |
| 5,181,015 | 1/1993 | Marshall et al. | 345/156 |
| 5,235,363 | 8/1993 | Vogeley et al. | 353/122 |
| 5,329,444 | * 7/1994 | Takahashi et al. | 705/8 |
| 5,422,693 | 6/1995 | Vogeley et al. | 353/122 |
| 5,434,595 | 7/1995 | Macaulay | 345/207 |
| 5,489,923 | 2/1996 | Marshall et al. | 345/156 |
| 5,502,459 | 3/1996 | Marshal et al. | 345/158 |
| 5,504,501 | 4/1996 | Hauck et al. | 345/158 |
| 5,511,148 | * 4/1996 | Wellner | 395/106 |
| 5,515,079 | 5/1996 | Hauck | 345/157 |
| 5,528,263 | 6/1996 | Platzker et al. | 345/156 |
| 5,584,552 | 12/1996 | Nam-Su et al. | 353/70 |
| 5,594,468 | 1/1997 | Marshall et al. | 345/158 |
| 5,661,667 | 8/1997 | Rueb et al. | 702/95 |
| 5,663,795 | 9/1997 | Rueb | 356/375 |
| 5,682,181 | 10/1997 | Nguyen et al. | 345/158 |
| 5,712,658 | 1/1998 | Arita et al. | 345/158 |
| 5,777,898 | * 7/1998 | Teterwak | 702/95 |
| 5,796,386 | 8/1998 | Lipscomb et al. | 345/156 |
| 5,803,570 | 9/1998 | Chen et al. | 353/122 |
| 5,973,672 | * 10/1999 | Rice et al. | 345/158 |
| 5,982,352 | * 11/1999 | Pryor | 345/156 |

* cited by examiner

Primary Examiner—Bipin Shalwala
Assistant Examiner—Ricardo Osorio
(74) Attorney, Agent, or Firm—Mark P. Watson

(57) ABSTRACT

An apparatus and method for calibrating a computer-generated projected image to the displayed image viewed on the computer screen. Four or more calibration spots, at least three of which are collinear, arrayed in a predetermined pattern in both the displayed and the projected images, are optically imaged and electronically discriminated in the projected image, their coordinates ascertained and related to the predetermined pattern so as to derive transformation coefficients used in the process of converting a location on the projected image to the corresponding location in the displayed image.

29 Claims, 2 Drawing Sheets

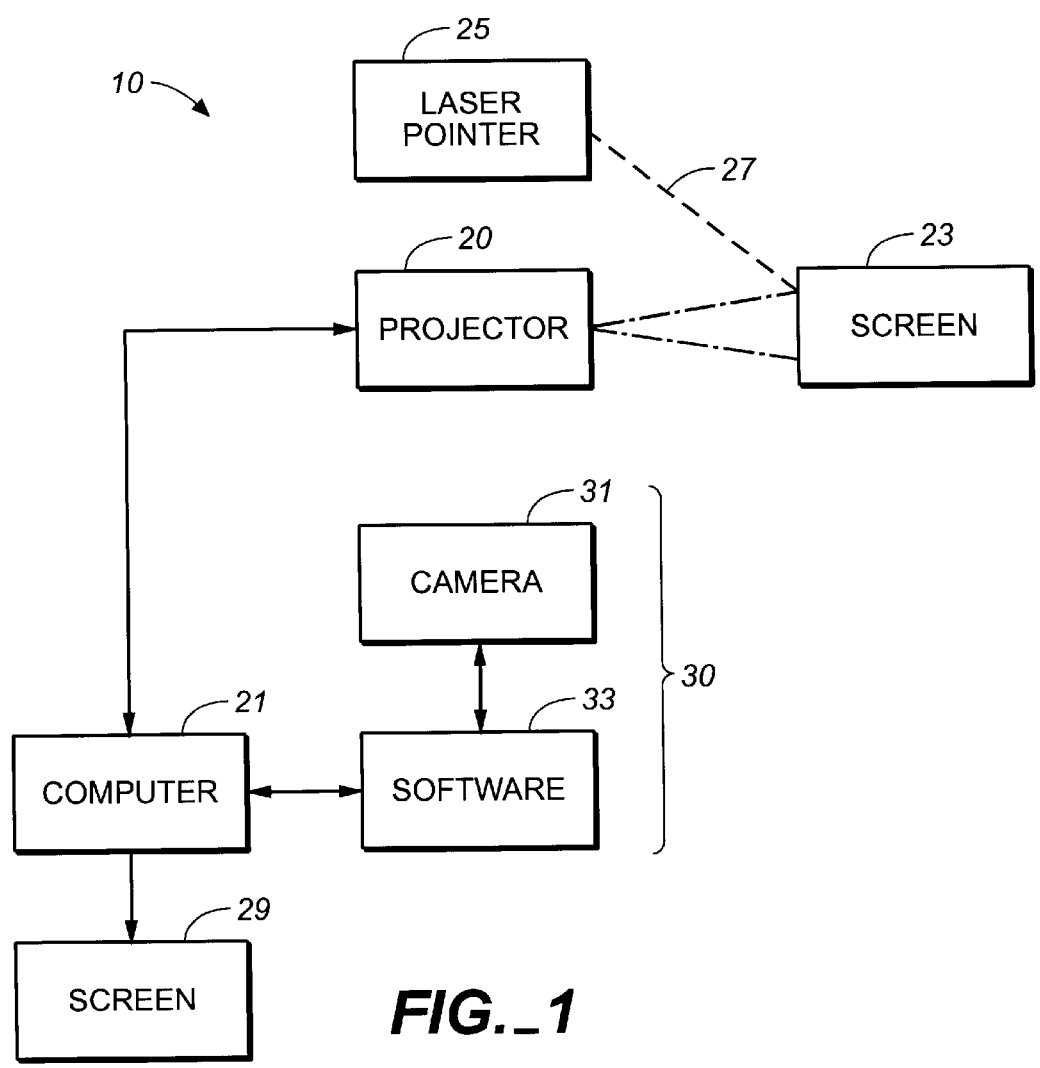
FIG._1

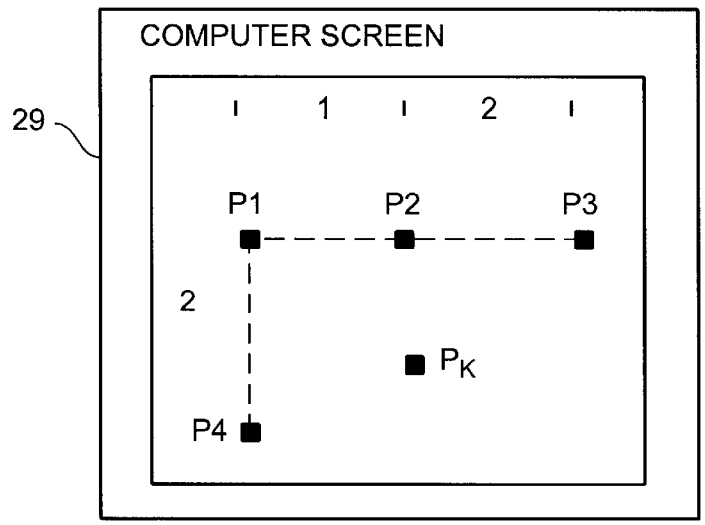
FIG._2
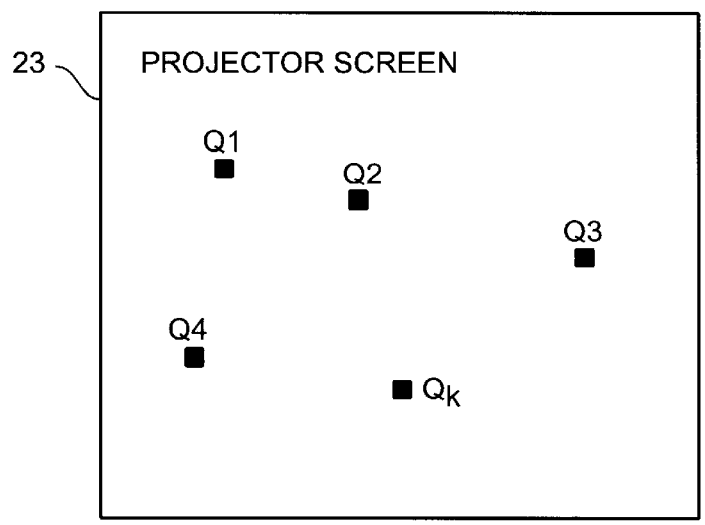
FIG._3
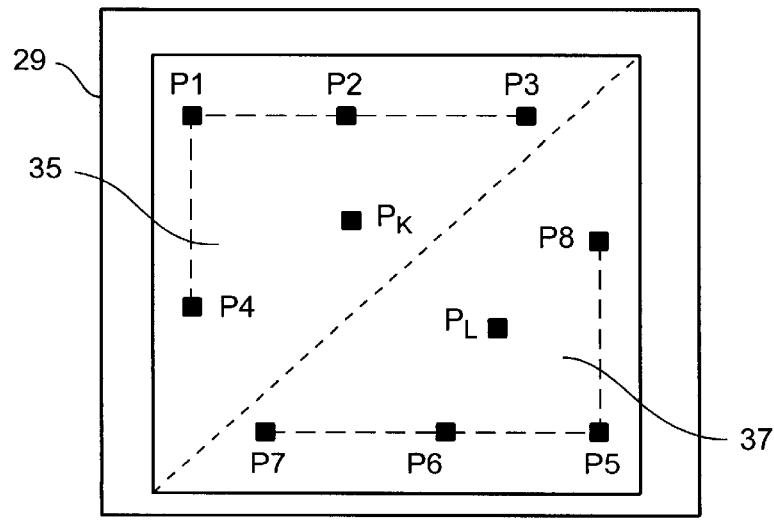
FIG._4

METHOD AND APPARATUS FOR CALIBRATING A COMPUTER-GENERATED PROJECTED IMAGE

BACKGROUND OF THE INVENTION

1. Field of the Invention

The present invention is related to interactive video display presentation systems and, more particularly, to a method and apparatus for calibrating such a system.

2. Description of the Related Art

In meetings and in classrooms, charts, text, and various graphical images are commonly presented to the audience by means of optical projection onto a projection screen or a wall. An LCD (liquid crystal display) projector is commonly used, where the charts, text, and graphical images are generated by a personal computer (PC), such as a laptop computer. These LCD/PC projection display systems are becoming more popular than the traditional overhead projector and transparencies which they replace. In such display systems, the PC provides video outputs such as standard VGA, Super VGA, or XGA.

The user controls the image being projected onto the projection screen by means of the PC keyboard, or by clicking a mouse in the appropriate area of the computer monitor display screen. Some systems provide limited, remote mouse control by using a line-of-sight infrared signal that is directed at the LCD projector and which controls some predefined functions, such as advancing the presentation to the next frame or drawing a straight line. One such apparatus, comprising radiation sensing means at the projection screen, enables an operator to interact with a computer-controlled image projection system, as disclosed in U.S. Pat. No. 5,235,363 issued to Vogeley et al. However, even with such features, most control operations need to be performed at the PC itself. If the speaker is standing at a lectern or moving before the audience, he cannot readily return to the PC to provide control. It becomes necessary to have an assistant seated at the computer to provide the control for certain aspects of the presentation.

In another variation of the display presentation, a laser pointer is used to project a control beam onto the projected image. An imaging device detects the control beam and relays this information to the PC. The user controls the PC by moving and switching the control beam on and off. To provide an accurate reference of the control beam to the displayed image on the PC screen, it is necessary to calibrate, or align, the projected image to the displayed image.

OBJECTS OF THE INVENTION

It is an object of the present invention to provide an method and apparatus for correlating the projection coordinates of the image elements projected onto a surface to the display coordinates of the corresponding image elements as displayed on the computer screen.

It is another object of the invention to provide such a method which is computationally simple, fast, and reliable.

SUMMARY OF THE INVENTION

An apparatus and method for calibrating the computer-generated projected image, such as found in a projection display system, to the displayed image viewed on the computer screen. Four or more calibration spots, arrayed in a predetermined pattern in both the displayed and the projected images, are optically imaged and electronically discriminated in the projected image, their coordinates ascertained and related to the predetermined pattern. With this relationship determined, there are found transformation coefficients which are subsequently used in the process of converting a location on the projected image to the corresponding location in the displayed image. Other features of the invention will be readily apparent when the following detailed description is read in connection with the drawings.

Other objects and attainments together with a fuller understanding of the invention will become apparent and appreciated by referring to the following description and claims taken in conjunction with the accompanying drawings.

BRIEF DESCRIPTION OF THE DRAWINGS

The invention description below refers to the accompanying drawings, of which:

FIG. 1 is a diagrammatical illustration of a display presentation system comprising a projector and a projector screen, a computer and a computer screen, and a calibration system, in accordance with the present invention;

FIG. 2 is a view of calibration spots generated in the display of the computer screen of FIG. 1;

FIG. 3 is a view of the calibration spots of FIG. 2 projected onto the projection screen of FIG. 1; and, FIG. 4 is a view of the computer screen of FIG. 2 as seen in an alternative calibration method.

DESCRIPTION OF THE PREFERRED EMBODIMENTS

There is shown in FIG. 1, a video display presentation system 10, comprising a projector 20, such as an LCD projector, a computer 21 and computer screen 29, and a calibration system 30, in accordance with the present invention. A presentation image (not shown) is projected onto a projection screen 23, upon which an incident laser beam 27 from a laser pointer 25 is used to control operations of computer 21. Calibration system 30 comprises an imaging device 31, such as a digital camera, and software 33. Imaging device 31 is directed at projection screen 23 so as to acquire the image projected onto projection screen 23 when projector 20 is operative. Software 33 comprises calibration software utilized in conjunction with imaging device 31 to calibrate presentation system 10, and comprises detection software to control computer 21 in response to the actions of laser beam 27 on projection screen 23, as described in greater detail below.

The operator of presentation system 10 uses laser pointer 25 to point to various parts of the displayed image, including those areas which represent application toolbars or "buttons." Camera 31 acquires the displayed image, and also detects the presence of laser beam 27 on projection screen 23. The resultant image is transmitted to computer 21 via software 33, here shown separately for convenience of description, but preferably embodied in camera 31, in computer 21, in projector 20, or in a separate interface box (not shown). Software 33 executes image processing and the detection of laser beam 27 on projection screen 23. In a preferred embodiment, a special mouse driver converts the coordinates of detected laser beam 27 into a mouse control function. For example, cursor movement and function selection may be effected by the position or movement of laser beam 27, and the blinking of laser beam 27 may be interpreted as a mouse "click." In this manner, the operator can use laser pointer 25 to perform virtually any normal mouse operation (e.g. open a new file, cut, paste, etc.) from essentially any location in the presentation room. This means of control is especially useful in presentations where the operator needs to access and navigate internet web links while speaking and moving about.

With the image displayed on computer screen 29 likewise being projected onto projection screen 23, control is effected by interpreting the presence of laser beam 27 at a particular spot on projection screen 23 as a mouse cursor pointing to the corresponding point on computer screen 29. As can be appreciated by one skilled in the relevant art, precise correspondence must be provided between the displayed image and the projected image for the control system to function properly. This correspondence is achieved by means of a calibration routine executed by calibration system 30 in accordance with the present invention.

Calibration is performed by first generating a set of four or more calibration spots within the application image displayed on computer screen 29, as shown in FIG. 2. For clarity of illustration, only the calibration spots, and not the application image, are shown. There are provided four calibration spots denoted as $P_1$ through $P_4$. $P_1$, $P_2$, and $P_3$ are preferably located in line with one another (i.e., collinear spots), with $P_2$ in the central location. $P_1$ and $P_2$ are spaced at an interval of one unit, and $P_2$ and $P_3$ are spaced at an interval of two units, as shown. Calibration spot $P_4$ is spaced at an interval of two units from $P_1$, and lies on a line extending perpendicularly to the line formed by $P_1$, $P_2$, and $P_3$.

In the process of calibration, the image displayed on computer screen 29 is projected onto projection screen 23 where the calibration spots appear as corresponding projected calibration spots $Q_1$ through $Q_4$. It can be appreciated by one skilled in the relevant art that a calibration spot $P_K$ on computer screen 29 can be mapped, via the linear transformation $\vec{Q}_K = A\vec{P}_K + B$, into the corresponding projected calibration spot $Q_K$ on projection screen 23, where A comprises a 2×2 real matrix, and B comprises a 2×1 real matrix. The values for A and B remain constant provided that the relative orientation and position of camera 31 to projection screen 23 remain fixed.

The calibration method disclosed in the present invention determines the values for A and B. In brief, the calibration method is performed as follows: i) a predetermined pattern with calibration spots of known locations is displayed, along with an application image, on computer screen 29, ii) the image and calibration spots are projected onto projection screen 23 by means of projector 20, iii) the projected image and calibration spots are acquired or imaged by camera 31, iv) the acquired image is analyzed by means of software 33 in filtering out all but the calibration spots, and v) the geometric relationship of pattern on projection screen 23 to the predetermined pattern on computer screen 29 is determined, also by means of software 33.

When correspondence between calibration spots is found, A and B are derived. For any point vector $\vec{P}_i$ and corresponding point vector $\vec{Q}_i$, the linear transformation $\vec{Q}_i = A\vec{P}_i + B$ is valid. Point vectors $\vec{P}_i$ and $\vec{Q}_i$ each comprise two coordinate values, and there are six (i.e., four in the (2×2) matrix and two in the (2×1) matrix) unknown variables in A and B. Therefore, a minimum of three pairs of locations or point vectors ($\vec{P}_i$, $\vec{Q}_i$) are needed to compute A and B.

In order to detect the displayed calibration spots at the four corresponding locations $Q_1$, $Q_2$, $Q_3$ and $Q_4$ in the projected image, the displayed calibration spots must be accurately identified and distinguished from the rest of the displayed image. However, because the displayed image may also comprise "noise," or visual artifacts caused by the optical or electrical characteristics of projector 20, for example, and such noise may be mistaken for the presence of a projected calibration spot, software 33 is designed to also filter out such noise and artifacts. Let the application image displayed on computer screen 29, without any calibration spots, be denoted by $I_1$. Let the displayed image with the calibration spots be denoted by $I_2$. The image comprising the four calibration spots can then be denoted by $I(x,y)=|I_2(x,y)-I_1(x,y)|$.

In order to remove the background, application image from the acquired image so as to leave just the calibration spots, a recursive thresholding routine is used to spatially filter out the background image and any noise which may be present. As can be appreciated by one skilled in the relevant art, the noise may be of the same or greater intensity as the calibration spots, and this noise may extend for several pixels, (e.g., such as in a vertical or horizontal line). But, noise does not normally extend both in height and in width while having the intensity of the calibration spots. In the disclosed method, therefore, an initial intensity threshold value $t_1$ is selected. The brightness levels, or intensities, of the pixels acquired from the projected image are compared to the threshold value. The image $I(x,y)$ is mapped into (0×1) matrix $I^T(x,y)$ such that $I^T(x,y)=1$ if $I(x,y)>t_1$, and $I^T(x,y)=0$ if $I(x,y)\leq t_1$, Preferably, the calibration spots are sized such that each comprises a plurality of pixels extending both in height and width. Calibration spots than then be spatially filtered, or discriminated, from the background application image by first grouping adjacent pixels, where the brightness or intensity of the pixel exceeds the predetermined threshold value. This can be accomplished by identifying a bright pixel in the matrix as having a value of "1," as defined above, and adding the pixel thus identified to an initially empty set. Adjacent, or neighboring, pixels are analyzed for brightness and added to the set until no further adjacent pixels exceeding the threshold are identified. This produces one or more sets, or clusters, of pixels having a value "1." Each set thus produced is compared to height ($h_1$) and width ($w_1$) threshold values in the spatial filtering process. If a set does not comprise at least the threshold height or width, then it is eliminated from further consideration and filtered out.

If the resultant filtered matrix comprises more than four clusters of pixels, then the above steps are repeated using a higher threshold value ($t_2>t_1$). Alternatively, if the resultant filtered matrix comprises fewer than 4 sets, then the above steps are repeated using a lower threshold value ($t_3<t_1$). These steps are repeated as necessary so as to result in the same number of clusters as there were calibration spots (e.g., four calibration spots, in the example provided). The mean positions, located at the approximate centers, of the clusters, are determined. These correspond to the mean positions of the displayed calibration spots at the locations of the four projected calibration spots $Q_1$, $Q_2$, $Q_3$ and $Q_4$ in the projected image.

The correspondence between the four projected calibration spots $Q_1$, $Q_2$, $Q_3$ and $Q_4$ and the four calibration spots $P_1$, $P_2$, $P_3$, and $P_4$ in the computer displayed image is next established. The transformation $Q=AP+B$ preserves the linear relationship and the distance ratio for points in the same line. The three collinear spots, including central spot $P_2$, are first identified. The remaining spot, e.g. $Q_4$, must correspond to $P_4$. To identify which of the collinear spots corresponds to $P_1$, $P_2$, and $P_3$, the distance ratio between the $Q_i$ calibration spots are evaluated. As discussed above, the distance ratios were selected to be $$|P_1-P_2|:|P_2-P_3|=1:2, \text{ and } |P_4-P_1|:|P_1-P_2|=2:1$$

Finding the same distance ratios in the projected calibration spots gives the correspondence between the three projected calibration spots $Q_1$, $Q_2$, and $Q_3$, with $Q_2$ as the central spot, and the displayed calibration spots $P_1$, $P_2$, and $P_3$, with $P_2$ as the central spot The desired transformation coefficients are then found by solving any three of the set of four vector equations given by:

$$\vec{Q}_1 = A\vec{P}_1 + B$$
$$\vec{Q}_2 = A\vec{P}_2 + B$$
$$\vec{Q}_3 = A\vec{P}_3 + B$$
$$\vec{Q}_4 = A\vec{P}_4 + B$$

With the values of A and B determined, a location $\vec{Q}_K$ in the projected image can be correlated with any location $\vec{P}_K$ in the computer display image in accordance with the relationship:

$$\vec{Q}_K = A\vec{P}_K + B$$

An alternative method, shown in FIG. 4, is useful when the projection of the image projected onto projection screen 23 is not precisely linear. The displayed image is divided into an upper region 35 and a lower region 37, separated by a screen diagonal. Calibration spots $P_1$, $P_2$, $P_3$, and $P_4$ are analyzed, as above, to determine the values of transformation coefficients A and B which are used in the upper portion of the projected image corresponding to upper region 35. A second set of calibration spots $P_5$, $P_6$, $P_7$, and $P_8$ are analyzed to determine the values of additional transformation coefficients A' and B', which are used in the lower portion of the projected image corresponding to lower region 37. Accordingly, a location $\vec{Q}_L$ in the lower portion of the projected image can be correlated with a location $\vec{P}_L$ in lower region 37 in accordance with the relationship:

$$\vec{Q}_L = A'\vec{P}_L + B'$$

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A method for correlating the projection coordinates $Q(x_Q, y_Q)$ of image elements projected onto a surface to the display coordinates $P(x_P, y_P)$ of the corresponding image elements as displayed on a computer screen, said method comprising the steps of:

generating a set of n calibration spots disposed in a nonlinear pattern within the displayed image, where $n \geq 4$, the predetermined coordinates of said calibration spots denoted by $P_i(x_P, y_P)$, where $1 \leq i \leq n$, each said calibration spot having a brightness greater than a predetermined threshold level;

projecting the displayed image and said calibration spots onto the projection surface so as to form a calibration image thereon, said calibration image comprising n bright clusters corresponding to said n calibration spots;

determining the projection coordinate of the mean position $Q_i(x_Q, y_Q)$ of each of said n bright clusters; and, deriving transformation coefficient matrices A and B by solving the set of vector equations given by:

$$\vec{Q}_1 = A\vec{P}_1 + B$$
$$\vec{Q}_2 = A\vec{P}_2 + B$$
$$\vdots$$
$$\vec{Q}_n = A\vec{P}_n + B$$

such that the display coordinate $P_k(x_P, y_P)$ of a displayed image element can be determined from the projection coordinate $Q_k(x_Q, y_Q)$ of the corresponding projected image element by means of the conversion equation $$\vec{Q}_k = A\vec{P}_k + B.$$

2. The method of claim 1 further comprising the steps of:

imaging and filtering said calibration image so as to sense only filtered image elements having a brightness greater than said predetermined threshold level; and, grouping adjacent said sensed filtered image elements into a plurality of said bright clusters, each said bright cluster having a corresponding height and width.

3. The method of claim 2 further comprising the step of spatially filtering said plurality of bright clusters so as to sense only bright clusters having a height at least as great as a predetermined value ($h_1$) prior to said step of determining the projection coordinate.

4. The method of claim 2 further comprising the step of spatially filtering said plurality of bright clusters so as to sense only bright clusters having a width at least as great as a predetermined value ($w_1$) prior to said step of determining the projection coordinate.

5. The method of claim 2 further comprising the step of counting said bright clusters, wherein if more than n said bright clusters are counted, selecting a threshold level higher than said predetermined threshold level and repeating said steps of filtering said calibration image, grouping said filtered image elements, and counting said bright clusters, and if fewer than n said bright clusters are counted, selecting a threshold level lower than said predetermined threshold level and repeating said steps of filtering said calibration image, grouping said filtered image elements, and counting said bright clusters.

6. The method of claim 2 wherein at least three of said calibration spots are collinear.

7. The method of claim 6 wherein a central one of said at least three collinear calibration spots is spaced a distance of one unit from one said collinear calibration spot and a distance of two units from another said collinear calibration spot.

8. The method of claim 7 wherein at least one said calibration spot is spaced a distance of two units from the line defined by said three collinear calibration spots.

9. The method of claim 1 further comprising the step of generating a second set of n calibration spots disposed in a nonlinear pattern within the displayed image, each said calibration spot in said second set having a brightness greater than said predetermined threshold level.

10. A method for correlating the projection coordinates $Q(x_Q, y_Q)$ of image elements projected onto a surface to the display coordinates $P(x_P, y_P)$ of the corresponding image elements as displayed on a computer screen, said method comprising the steps of:

generating a set of n calibration spots disposed in a nonlinear pattern within the displayed image, where $n \geq 4$, the predetermined coordinates of said calibration spots denoted by $P_i(x_P, y_P)$, where $1 \leq i \leq n$, each said calibration spot having a predetermined height and a predetermined width;

projecting the displayed image and said calibration spots onto the projection surface so as to form a calibration image thereon;

imaging and filtering said calibration image so as to sense only filtered image elements having a brightness greater than a predetermined threshold level;

grouping adjacent said filtered image elements into a plurality of bright clusters, each said bright cluster having a corresponding height and width;

spatially filtering said plurality of bright clusters so as to sense only bright clusters having a height at least as great as a predetermined value ($h_1$) and having a width at least as great as a predetermined value ($w_1$);

counting said spatially filtered bright clusters, wherein if more than n said spatially filtered bright clusters are counted, selecting a threshold level higher than said predetermined threshold level and repeating said steps of filtering said calibration image, grouping said filtered image elements, spatially filtering said bright clusters, and counting said spatially filtered bright clusters, and if fewer than n said filtered bright clusters are counted, selecting a threshold level lower than said predetermined threshold level and repeating said steps of filtering said calibration image, grouping said filtered image elements, spatially filtering said bright clusters, and counting said spatially filtered bright clusters;

determining the projection coordinate of the mean position $Q_i(x_Q, y_Q)$ of each of said n spatially filtered bright clusters; and, deriving transformation coefficient matrices A and B by solving the set of vector equations given by:

$$\vec{Q}_1 = A\vec{P}_1 + B$$
  $$\vec{Q}_2 = A\vec{P}_2 + B$$
  $$\vdots$$
  $$\vec{Q}_n = A\vec{P}_n + B$$

such that the display coordinate $P_k(x_P, y_P)$ of a displayed image element can be determined from the projection coordinate $Q_k(x_Q, y_Q)$ of the corresponding projected image element by means of the conversion equation $$\vec{Q}_k = A\vec{P}_k + B.$$

11. The method of claim 10 wherein each said calibration spot comprises a brightness greater than said predetermined threshold level.

12. The method of claim 10 wherein at least three of said calibration spots are collinear.

13. The method of claim 12 wherein a central one of said at least three collinear calibration spots is spaced a distance of one unit from one said collinear calibration spot and a distance of two units from another said collinear calibration spot.

14. The method of claim 13 wherein at least one said calibration spot is spaced a distance of two units from the line defined by said three collinear calibration spots.

15. The method of claim 10 further comprising the step of generating a second set of n calibration spots disposed in a nonlinear pattern within the displayed image, each said calibration spot in said second set having a brightness greater than said predetermined threshold level.

16. A calibration apparatus, suitable for correlating the projection coordinates $Q(x_Q, y_Q)$ of an image projected onto a surface to the display coordinates $P(x_P, y_P)$ of the corresponding image and included calibration spots as displayed on a computer screen, the image comprising n calibration spots disposed in a nonlinear pattern within the projected image, where $n \geq 4$, said calibration apparatus comprising:

means for imaging and filtering said calibration image so as to sense only the n projected calibration spots;

means for determining the projection coordinates of the mean position $Q_i(x_Q, y_Q)$ for each of said calibration spots, where $1 \leq i \leq n$;

means for deriving conversion matrices A and B by solving the set of vector equations given by:

$$\vec{Q}_1 = A\vec{P}_1 + B$$
  $$\vec{Q}_2 = A\vec{P}_2 + B$$
  $$\vdots$$
  $$\vec{Q}_n = A\vec{P}_n + B;$$

and, means for determining the display coordinate $P_k(x_P, y_P)$ of a displayed image element from the projection coordinate $Q_k(x_Q, y_Q)$ of the corresponding projected image element by utilizing the conversion equation $$\vec{Q}_k = A\vec{P}_k + B.$$

17. The apparatus of claim 16 wherein said projected calibration spots comprise a brightness greater than a predetermined threshold level.

18. The apparatus of claim 16 wherein said projected calibration spots comprise a width at least as great as a predetermined value ($w_1$).

19. The apparatus of claim 16 wherein said projected calibration spots comprise a height at least as great as a predetermined value ($h_1$).

20. The apparatus of claim 16 wherein said means for imaging and filtering comprises a digital camera.

21. A medium readable by a machine embodying a program of instructions executable by said machine to perform a method for correlating the projection coordinates $Q(x_Q, y_Q)$ of image elements projected onto a surface to the display coordinates $P(x_P, y_P)$ of the corresponding image elements as displayed on a computer screen, said method comprising the steps of:

generating a set of n calibration spots disposed in a nonlinear pattern within the displayed image, where $n \geq 4$, the predetermined coordinates of said calibration spots denoted by $P_i(x_P, y_P)$, where $1 \leq i \leq n$, each said calibration spot having a brightness greater than a predetermined threshold level;

projecting the displayed image and said calibration spots onto the projection surface so as to form a calibration image thereon, said calibration image comprising n bright clusters corresponding to said n calibration spots;

determining the projection coordinate of the mean position $Q_i(x_Q,y_Q)$ of each of said n bright clusters; and, deriving transformation coefficient matrices A and B by solving the set of vector equations given by:

$$\vec{Q}_1 = A\vec{P}_1 + B$$

$$\vec{Q}_2 = A\vec{P}_2 + B$$

$$\vdots$$

$$\vec{Q}_n = A\vec{P}_n + B$$

such that the display coordinate $P_k(x_P,y_P)$ of a displayed image element can be determined from the projection coordinate $Q_k(x_Q,y_Q)$ of the corresponding projected image element by means of the conversion equation $$\vec{Q}_k = A\vec{P}_k + B.$$

22. The medium of claim 21 wherein the method further comprises the steps of:

imaging and filtering said calibration image so as to sense only filtered image elements having a brightness greater than said predetermined threshold level; and, grouping adjacent said sensed filtered image elements into a plurality of said bright clusters, each said bright cluster having a corresponding height and width.

23. The medium of claim 22 wherein the method further comprises the step of spatially filtering said plurality of bright clusters so as to sense only bright clusters having a height at least as great as a predetermined value ($h_1$) prior to said step of determining the projection coordinate.

24. The medium of claim 22 wherein the method further comprises the step of spatially filtering said plurality of bright clusters so as to sense only bright clusters having a width at least as great as a predetermined value ($w_1$) prior to said step of determining the projection coordinate.

25. The medium of claim 22 wherein the method further comprises the step of counting said bright clusters, wherein if more than n said bright clusters are counted, selecting a threshold level higher than said predetermined threshold level and repeating said steps of filtering said calibration image, grouping said filtered image elements, and counting said bright clusters, and if fewer than n said bright clusters are counted, selecting a threshold level lower than said predetermined threshold level and repeating said steps of filtering said calibration image, grouping said filtered image elements, and counting said bright clusters.

26. The medium of claim 22 wherein at least three of said calibration spots are collinear.

27. The medium of claim 26 wherein a central one of said at least three collinear calibration spots is spaced a distance of one unit from one said collinear calibration spot and a distance of two units from another said collinear calibration spot.

28. The medium of claim 27 wherein at least one said calibration spot is spaced a distance of two units from the line defined by said three collinear calibration spots.

29. The medium of claim 21 wherein the method further comprises the step of generating a second set of n calibration spots disposed in a nonlinear pattern within the displayed image, each said calibration spot in said second set having a brightness greater than said predetermined threshold level.

* * * * *